(12) United States Patent
Lai et al.

(10) Patent No.: US 9,400,932 B2
(45) Date of Patent: Jul. 26, 2016

(54) IDENTIFICATION METHOD AND APPARATUS UTILIZING THE METHOD

(71) Applicant: Wistron Corp., New Taipei (TW)

(72) Inventors: Chin-Lun Lai, New Taipei (TW); Jun-Horng Chen, New Taipei (TW); Chih-Hong Chu, New Taipei (TW); Shu-Chen Li, New Taipei (TW); Jing-Ying Hsu, New Taipei (TW)

(73) Assignee: WISTRON CORP., New Taipei (TW)

( * ) Notice: Subject to any disclaimer, the term of this patent is extended or adjusted under 35 U.S.C. 154(b) by 227 days.

(21) Appl. No.: 14/282,860

(22) Filed: May 20, 2014

(65) Prior Publication Data
US 2015/0178580 A1 Jun. 25, 2015

(30) Foreign Application Priority Data
Dec. 20, 2013 (TW) ............................... 102147471 A

(51) Int. Cl.
*G06K 9/00* (2006.01)
(52) U.S. Cl.
CPC ........ *G06K 9/00899* (2013.01); *G06K 9/00288* (2013.01); *G06K 9/00617* (2013.01)
(58) Field of Classification Search
None
See application file for complete search history.

(56) References Cited

U.S. PATENT DOCUMENTS

| | | | | |
|---|---|---|---|---|
| 2003/0142853 A1* | 7/2003 | Waehner | ............... | G06K 9/2036 382/118 |
| 2005/0180612 A1* | 8/2005 | Nagahashi | ......... | G06K 9/00248 382/118 |
| 2007/0098222 A1* | 5/2007 | Porter | ................ | G06K 9/00234 382/103 |
| 2009/0009309 A1* | 1/2009 | Matsuoka | .............. | G08B 21/06 340/439 |
| 2009/0015788 A1* | 1/2009 | Knaan | ..................... | A61B 3/113 351/209 |
| 2009/0297038 A1* | 12/2009 | Ishikawa | ............. | G06K 9/3275 382/209 |
| 2013/0114852 A1 | 5/2013 | Gu et al. | | |

FOREIGN PATENT DOCUMENTS

| | | |
|---|---|---|
| CN | 103440479 A | 12/2013 |
| TW | 200825989 A | 6/2008 |

OTHER PUBLICATIONS

Recognizing Clothes Patterns for Blind People by Confidence Margin based Feature Combination, Yang et al. ACM 978-1-4503-0616-4, 2011, pp. 1097-1100.*
Evaluation of Face Datasets as Tools for Assessing the Performance of Face Recognition Methods, Lior Shamir, Jul. 8, 2008, pp. 1-9.*
Clothing Cosegmentation for Recognizing People, Gallagher et al., IEEE, 978-1-4244-2243-2, 2008, pp. 1-8.*
Entropy-Based Localization of Textured Regions, Presti et al., Springer ICIAP 2011, Part I, LNCS 6978, pp. 616-625.*
TW Office Action dated May 21, 2015 as received in Application No. 102147471 (English Translation).

* cited by examiner

*Primary Examiner* — Jayesh A Patel
(74) *Attorney, Agent, or Firm* — Maschoff Brennan

(57) ABSTRACT

An identification method and an apparatus utilizing the method are disclosed. The disclosed method comprises capturing a first examining image at a first direction, performing a face detection process on the first examining image to identify a first face image in the first examining image, detecting a number of straight lines which are within a detecting image block of the first examining image but outside the first face image, comparing the number of straight lines with a quantity threshold to obtain a first judgment value, and judging if the first face image pass an examination at least according to the first judgment value.

17 Claims, 17 Drawing Sheets

IDENTIFICATION METHOD AND APPARATUS UTILIZING THE METHOD

CROSS REFERENCE

The present application is based on, and claims priority from, Taiwan Application Serial Number 102,147,471, filed on Dec. 20, 2013, the disclosure of which is hereby incorporated by reference herein in its entirety.

TECHNIQUE

1. Field

The invention is related to an identification method and an apparatus utilizing the same, and more particularly to an identification method determining whether a user to be verified attempts to pretend to be someone else by analyzing the characteristic in a verifying image and an apparatus utilizing the method.

2. Background

The face identification and/or verification techniques were usually utilized in places with high security requirement. However, security systems with the face identification technique are now deployed in mansions or school laboratories because people put more emphases on daily security management.

However, conventional face identification systems usually identify users according to face images stored in the database thereof. Hence, security systems with face identification technique may be deceived by users pretending to be someone else with pre-acquired face images.

SUMMARY OF THIS INVENTION

In one or more embodiments of this invention, an identification method comprises the steps of: capturing a first verifying image toward a first direction, identifying a first face image in the first verifying image by performing a face detection process on the first verifying image, detecting an amount of at least one straight lines within a detection image block in the first verifying image but outside of the first face image, obtaining a first determination value by comparing the amount of the at least one straight lines with a threshold of amount, and determining whether the first face image passes an identification at least according to the first determination value.

In one or more embodiments of this invention, an apparatus for identification comprises an image capturing module and a processing module. The image capturing module is used for capturing a first verifying image toward a first direction. The processing module is electrically coupled to the image capturing module and comprising a face identification unit, a line detection unit, and a verification unit. The face identification unit is electrically coupled to the image capturing module and used for identifying a first face image in the first verifying image by performing a face detection process on the first verifying image. The line detection unit is electrically coupled to the image capturing module and the face identification unit and used for detecting an amount of at least one straight line within a detection image block in the first verifying image but outside of the first face image. The verification unit is electrically coupled to the line detection unit, used for obtaining a first determination value by comparing the amount of the at least one straight lines with a threshold of amount, and used for determining whether the first face image passes an identification at least according to the first determination value.

With the method or the apparatus according to at least one embodiment of this invention, a verifying image having a face image is captured. The amount of the straight lines within the verifying image or the length of the straight lines within the verifying image is calculated so as to determine whether a user to be verified attempts to pretend to be someone else.

In order to make the aforementioned and other features of the present invention more comprehensible, several embodiments accompanied with figures are described in detail below.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THIS INVENTION

Figure 1:
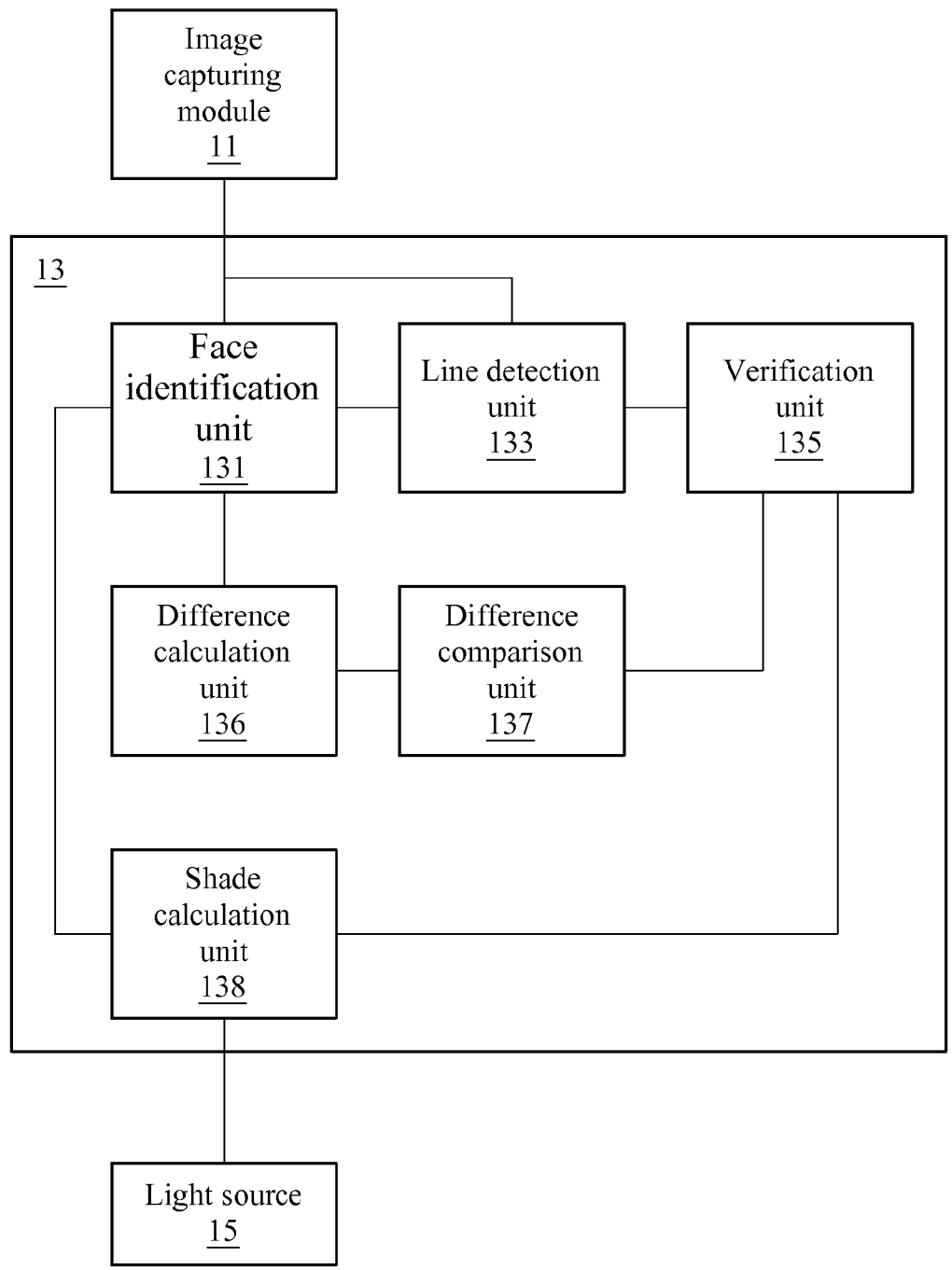
FIG. 1 is a functional block diagram of an apparatus for identification according to one embodiment of this invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As to an apparatus for identification according to one embodiment of this invention, please refer to FIG. 1, which is a functional block diagram of an apparatus for identification according to one embodiment of this invention. As shown in FIG. 1, the Apparatus for identification 1 may comprise an image capturing module 11and a processing module 13. The processing module 13 is electrically coupled to the image capturing module 11. Additionally, the processing module 13 may comprise a face identification unit 131, a line detection unit 133, and a verification unit 135. The face identification unit 131 is electrically coupled to the image capturing module 11. The line detection unit 133 is electrically coupled to both of the image capturing module 11 and the face identification unit 131. The verification unit 135 is electrically coupled to the line detection unit 133.

The image capturing module 11 may be used for capturing a first verifying image toward a first direction. The first verifying image comprises an image of a user to be verified. Hence, the first verifying image may be a head portrait of the user to be verified, a half-length photographic portrait of the user to be verified, or a full-length photographic portrait of the user to be verified. The image capturing module 11 utilized in one or more embodiments of this invention may be, for example but not limited to, a still camera, a video camera, a monitoring device, or any other devices applicable for capturing/shooting image(s).

The face identification unit 131 may be used for identifying a first face image in the first verifying image by performing a face detection process on the first verifying image. For example, there may be a plurality of faces detected or identified in the first verifying image, but, ordinarily, the user to be verified should be facing and close to the image capturing module 11 the most. Hence, if multiple face images are detected in the first verifying image when the conventional face detection process is performed, a face image among the multiple face images, which the corresponding face is facing the image capturing module 11 and has an area greater than a threshold or the biggest area of face, may be selected as the first face image.

The line detection unit 133 may be used for detecting an amount of at least one straight line within a detection image block in the first verifying image but outside of the first face image. For example, after the first face image is determined, two image blocks in the left side of the first face image and in the right side of the first face image within the first verifying image can be selected to be the detection image blocks. In another embodiment, the image block above the first face image within the first verifying image can be selected to be the detection image block. In yet another embodiment, the first verifying image as a whole may be selected as the detection image block. In such embodiment, the user to be verified may wear clothes with stripes, so the image block below the first face image within the first verifying image can be excluded so that the verification may be more accurate.

Figure 2:
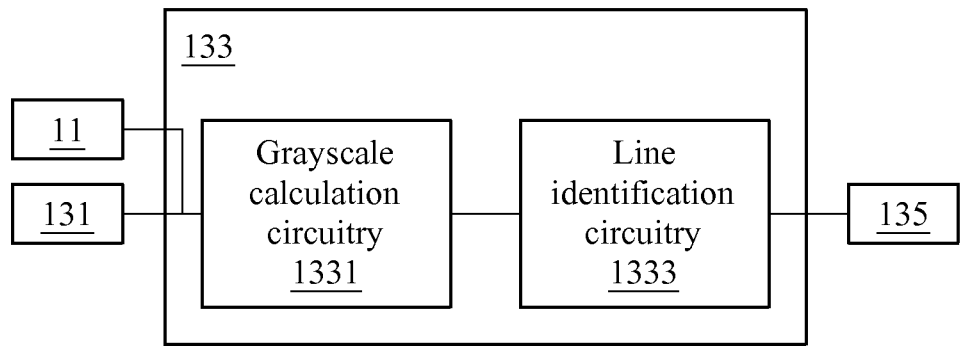
FIG. 2 is a functional block diagram of a line detection unit according to one embodiment of this invention.

Please now refer to FIG. 2, which is a functional block diagram of a line detection unit according to one embodiment of this invention. As shown in FIG. 2, the line detection unit 133 may comprise a grayscale calculation circuitry 1331 and a line identification circuitry 1333. The grayscale calculation circuitry 1331 is electrically coupled to the image capturing module 11 and the face identification unit 131, and the line identification circuitry 1333 is electrically coupled to the grayscale calculation circuitry 1331 and the verification unit 135. To determine the amount of the straight line(s), the grayscale calculation circuitry 1331 in the line detection unit 133 may firstly calculate a plurality of grayscales corresponding to a plurality of pixels in the detection image block. Specifically, the grayscale calculation circuitry 1331 calculates a grayscale for each pixel in the detection image block. Afterwards, the line identification circuitry 1333 identifies at least one straight line in the detection image block according to these calculated grayscales.

After straight lines in the detection image block are identified, the line identification circuitry 1333 may further determine whether an identified straight line is roughly horizontal or substantially vertical. For example, a straight line having an angle relative to a horizontal line less than 5 degree may be recognized as a line which is roughly horizontal. Certain straight lines are selected accordingly, and the total amount of the selected straight lines is then calculated. In another embodiment, the line identification circuitry 1333 calculates the total length of the selected straight lines. In yet another embodiment, the line identification circuitry 1333 calculates the total amount of pixels corresponding to the selected straight lines.

Please refer back to FIG. 1. The verification unit 135 is used for obtaining a first determination value by comparing the amount of the at least one lines with a threshold of amount, and determining whether the first face image passes an identification at least according to the first determination value. For example, if the line detection unit 133 outputs the amount of the selected lines and a threshold of the amount is set as two, the first determination value will be set as "possible to be false" when the amount of the selected lines is greater than two. If only the first determination value is used for determining whether the first face image passes the identification, the first face image will determined to be not passing the identification.

In another embodiment, if the line detection unit 133 outputs the total length of the selected lines, such as how many pixels are occupied by the selected lines, the threshold of amount may be set as 1024 or the number of pixels in one row in the first verifying image. If the total length of the selected lines is greater than the threshold of amount, the first determination value will be set as "possible to be false." If only the first determination value is used for determining whether the first face image passes the identification, the first face image will determined to be not passing the identification.

According to one embodiment of this invention, the aforementioned modules and units may be used for determining, according to the captured first verifying image, whether the user to be verified attempts to pretend as he/she is someone else by using a picture or a display device. If it is determined that the user to be verified possibly attempts to pretend to be someone else, the verification unit 135 in the processing module 13 determines that the first face image in the first verifying image fails to pass the identification. In one or more embodiment of this invention, the processing module 13 and the units therein may be realized with, for example but not limited to, an application-specific integrated circuit (ASIC), an advanced RISC machine (ARM), a central processing unit (CPU), a mono-chip controller, or any other devices applicable for performing arithmetic and/or manipulation.

In one embodiment of this invention, the image capturing module 11 may further capture a second verifying image toward the first direction. The face identification unit 131 may further identifies a second face image in the second verifying image by performing the face detection process on the second verifying image. Specifically, the image capturing module 11 may successively capture the first verifying image and the second verifying image. If the user to be verified does not attempt to pretend to be someone else with a picture or a display device, the first face image in the first verifying image will differ from the second face image in the second verifying image corresponding to the first face image because of the physiological responses of the human being. The physiological responses of the human being are used in this embodiment to help the apparatus for identification to determine whether the user to be verified attempts to pretend to be someone else with a picture or a display device.

In this embodiment, please refer back to FIG. 1. The processing module 13 may further comprise a difference calculation unit 136 and a difference comparison unit 137. The difference calculation unit 136 is electrically coupled to the face identification unit 131, and the difference comparison unit 137 is electrically coupled to the difference calculation unit 136 and the verification unit 135.

The difference calculation unit 136 is used for calculating an amount of differences by comparing the first face image with the second face image. The difference comparison unit 137 is used for obtaining a second determination value by comparing the amount of differences with a threshold of difference. The verification unit 135 determines whether the first face image passes the identification further according to the second determination value. In one example, the user to be verified may wear clothes with stripes or stand in front of a closet. Hence, the verification unit 135 may calculate and determine that the total amount of straight lines or the total length of straight lines is greater than the threshold of difference, so the first determination value is set as "possible to be false." However, in this embodiment, it is probably determined that the user to be verified is blinking according to the first verifying image and the second verifying image, so the second determination value is set as "possible to be true." The processing module 13 may then assign the first determination value and second determination value with different weight values, so the verification unit 135 may determine whether the first face image passes the identification according to the first determination value with its weight value and the second determination value with its weight value.

Figure 3:
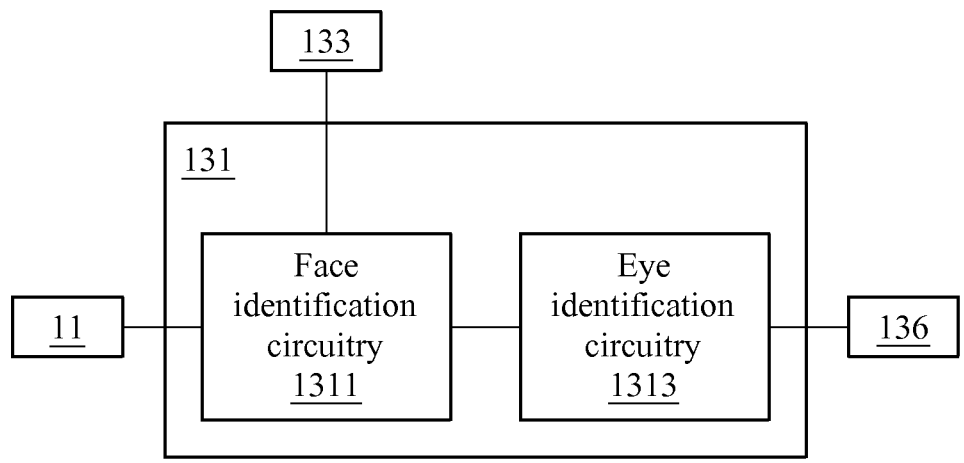
FIG. 3 is a functional block diagram of a face identification unit according to one embodiment of this invention.

In one embodiment, please refer to FIG. 3, which is a functional block diagram of a face identification unit according to one embodiment of this invention. As shown in FIG. 3, the face identification unit 131 may comprise a face identification circuitry 1311 and an eye identification circuitry 1313. The face identification circuitry 1311 may be electrically coupled between the image capturing module 11 and the line detection unit 133. The eye identification circuitry 1313 may be electrically coupled to the face identification circuitry 1311 and the difference calculation unit 136. The face identification circuitry 1311 may perform the face detection process on the first verifying image and/or the second verifying image so as to identify the first face image and/or the second face image.

When the first face image and the second face image are identified or detected, the eye identification circuitry 1313 may, respectively, find the first eye image and the second eye image in the first face image and the second face image. For example, the first eye image may be one of two eye images in the first face image, such as the right eye image in the first face image, while the second eye image may be the corresponding one of the two eye images in the second face image, such as the right eye image in the second face image if the first eye image is the right eye image in the first face image. As such, the difference calculation unit 136 can compare the first eye image with the second eye image to obtain the amount of differences accurately.

Figure 4A:
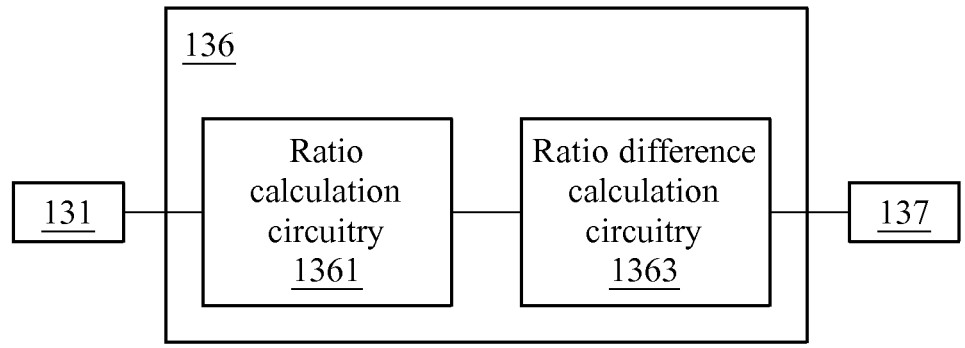
FIG. 4A is a functional block diagram of a difference calculation unit according to one embodiment of this invention.

In one embodiment, please refer to FIG. 4A, which is a functional block diagram of a difference calculation unit according to one embodiment of this invention. As shown in FIG. 4A, the difference calculation unit 136 may comprise a ratio calculation circuitry 1361 and a ratio difference calculation circuitry 1363. The ratio calculation circuitry 1361 is electrically coupled to the face identification unit 131, and the ratio difference calculation circuitry 1363 is electrically coupled to the ratio calculation circuitry 1361 and the difference comparison unit 137.

The ratio calculation circuitry 1361 may be used for calculating a first pupil ratio between a first pupil image in the first eye image and the first eye image and calculating a second pupil ratio between a second pupil image in the second eye image and the second eye image. In another embodiment, the ratio calculation circuitry 1361 may calculates a first iris ratio between a first iris image and the first eye image and a second iris ratio between a second iris image and the second eye image.

The ratio difference calculation circuitry 1363 may be used for obtaining the amount of differences by calculating a difference, or an absolute difference, between the first pupil ratio and the second pupil ratio. In another embodiment, if the ratio calculation circuitry 1361 calculates the iris ratio, the ratio difference calculation circuitry 1363 may calculate the absolute difference between the first iris ratio and the second iris ratio. In practice, blinking is one of the physiological responses of human beings, so it is inevitable to most people. Accordingly, the first pupil ratio should be different from the second pupil ratio unless the user to be verified pretend to be someone else with a picture or a display device. Specifically, the pupil ratio or the iris ratio when the user is keeping his/her eyes open is different from the pupil ratio or the iris ratio when the user is blinking. Hence, if the difference comparison unit 137 determines that the absolute difference between the first pupil ratio and the second pupil ratio, which is the amount of differences, is greater than the threshold of difference, the difference comparison unit 137 may determine that the user to be verified is blinking and the second determination value can be set as "possible to be true." On the contrary, if the difference comparison unit 137 determines that the absolute difference between the first pupil ratio and the second pupil ratio is less than the difference ratio, the difference comparison unit 137 may determine that the user to be verified is not blinking. Then the second determination value may be set as "possible to be false" because the user to be verified may probably pretend to be someone else with a picture or a display device.

Figure 4B:
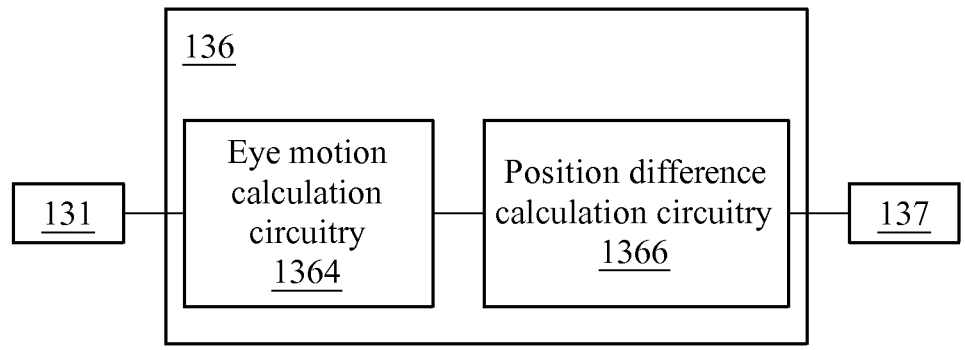
FIG. 4B is a functional block diagram of a difference calculation unit according to one embodiment of this invention.

In one embodiment, please refer to FIG. 4B, which is a functional block diagram of a difference calculation unit according to one embodiment of this invention. As shown in FIG. 4B, the difference calculation unit 136 may comprise an eye motion calculation circuitry 1364 and a position difference calculation circuitry 1366. The eye motion calculation circuitry 1364 is electrically coupled to the face identification unit 131, and the position difference calculation circuitry 1366 is electrically coupled to the eye motion calculation circuitry 1364 and the difference comparison unit 137.

The eye motion calculation circuitry 1364 may be used for identifying a first pupil image in the first eye image, calculating a first relative position between the first pupil image and the first eye image, identifying a second pupil image in the second eye image, and calculating a second relative position between the second pupil image and the second eye image.

Take the step of calculating the first relative position for example, the eye motion calculation circuitry 1364 may firstly find the dark portion (or gray portion, depending on the race of the user to be verified) in the first eye image to set it as the first pupil image or the first iris image. The eye motion calculation circuitry 1364 then calculates the centroid of the first eye image and the centroid of the first pupil image and takes the relative position, such as a vector or a distance, between the centroid of the first eye image and the centroid of the first pupil image as the first relative position. With the same or similar method, the second relative position can be found between the second eye image and the second pupil image.

The position difference calculation circuitry 1366 may be used for obtaining the amount of differences by calculating a difference between the first relative position and the second relative position. For example, if the first relative position and the second relative position calculated by the eye motion calculation circuitry 1364 are two vectors, the position difference calculation circuitry 1366 will calculate a vector which is the difference between those two vectors. The position difference calculation circuitry 1366 also takes the length of the calculated vector to be the amount of differences. If the first relative position and the second relative position calculated by the eye motion calculation circuitry 1364 are two distances, the difference between those two distances is taken as the amount of differences.

In practice, the eye movement is usually an unintentional behavior to the user to be verified. Hence, the difference comparison unit 137 may determine whether the eyes of the user to be verified are moved according to the aforementioned amount of differences. If the amount of differences was greater than the threshold of difference, the eyes of the user to be verified are moved and the difference comparison unit 137 may set the second determination value as "possible to be true." Otherwise, the difference comparison unit 137 may set the second determination value as "possible to be false."

Figure 4C:
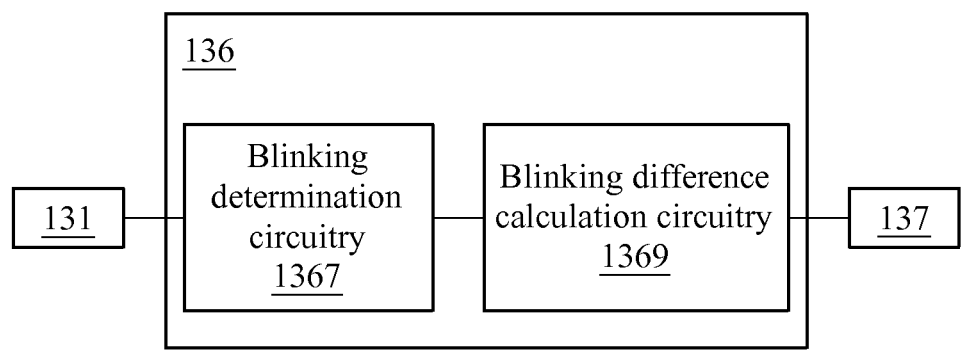
FIG. 4C is a functional block diagram of a difference calculation unit according to one embodiment of this invention.

In one embodiment, please refer to FIG. 4C, which is a functional block diagram of a difference calculation unit according to one embodiment of this invention. As shown in FIG. 4C, the difference calculation unit 136 may comprise a blinking determination circuitry 1367 and a blinking difference calculation circuitry 1369. The blinking determination circuitry 1367 is electrically coupled to the face identification unit 131, and the blinking difference calculation circuitry 1369 is electrically coupled to the blinking determination circuitry 1367 and the difference comparison unit 137.

The blinking determination circuitry 1367 may be used for determining whether the first eye image and the second eye image are similar images according to similarity criteria and calculating an area of the first eye image and an area of the second eye image when the first eye image and the second eye image are not similar images. If two images were determined according to the similarity criteria to be similar images/shapes, these two images have the same shape but different scales.

If the blinking difference calculation circuitry 1369 was informed by the blinking determination circuitry 1367 that the first eye image and the second eye image are similar images, it means that the user to be verified is not blinking and the amount of differences is set to be zero. Otherwise, the blinking difference calculation circuitry 1369 will calculate the ratio between the area of the first eye image and the area of the second eye image to obtain the amount of differences. For example, if the ratio is 1.2, the amount of differences will be set to be 1.2. If the ratio is 0.8, the amount of differences will be set to be 1.25. To be simplified, after the ratio between the first eye image and the second eye image is calculated, the amount of differences is as the ratio only if the ratio is greater than one. If the ratio was less than one, the amount of differences can be set as one over the ratio.

In this embodiment, the threshold of difference may be set as one, so when the user to be verified is blinking, the amount of differences will be greater than the threshold of difference and the difference comparison unit 137 will set the second determination value as "possible to be true." Otherwise, the amount of differences will be less than the threshold of difference and the difference comparison unit 137 will assume that the user to be verified might pretend to be someone else with a display device or a picture. Accordingly, the second determination value will be set as "possible false."

In one embodiment, please refer back to FIG. 1. The apparatus for identification 1 may further comprise a light source 15. The light source 15 is electrically coupled to the processing module 13 and used for casting light toward a second direction to make the first face image to have at least one spot corresponding to the light source 15. The second direction may be parallel to the first direction in one embodiment, while these two directions are not parallel in another embodiment. If the second direction is parallel to the first direction, the light source 15 should cast light to the edge of the face of the user to be verified. If two directions are not parallel, the position onto which the light source 15 casts light is not limited. The light source 15 may have a specified predetermined pattern. For example, the predetermined pattern may be stripes or plaids. In one or more embodiments of this invention, the light source 15 may be composed of light emitting diodes (LEDs) or any other light emitting devices. In one embodiment, the light emitted by the light source 15 may be infrared or ultraviolet and the image capturing module 11 should be able to detect infrared or ultraviolet correspondingly. In such embodiment, the user to be verified is not aware of the fact that the apparatus of identification 1 takes the light source 15 and the pattern thereof as assistances, so the probability that the user to be verified would try to cheat the identification mechanism with the assistances is reduced and the security is then improved.

In this embodiment, the processing module 13 may further comprise a shade calculation unit 138. The shade calculation unit 138 is electrically coupled to the light source 15, the face identification unit 131, and the verification unit 135. The shade calculation unit 138 may be used for obtaining a third determination value by determining whether the spot is varied according to the predetermined pattern. For example, if the light source 15 casts light onto the face of the user to be verified with a pattern of the plaid, the spots in the first face image will vary irregularly because the face of the user to be verified is not a plain surface. On the contrary, if the user to be verified attempts to pretend to be someone else with a picture or a display device, the light emitted from the light source 15 will casted onto the picture or the display device. The surface of the picture or the surface of the display device is a plain surface or a smooth curved surface, so the spots in the first face image will vary regularly, such as from a circle to a ellipse or from a square to a rectangular, a rhombus or a parallelogram. Hence, the shade calculation unit 138 determines that the spots varies irregularly, the shade calculation unit 138 may set the third determination value as "possible to be true." Otherwise, the third determination value may be set as "possible to be false."

Additionally, the light source 15 may be a light source without specific predetermined pattern. When such light source 15 casts light onto a plain surface such as a picture or a display device, the first face image in the first verifying image will have a uniform shade. On the contrary, if the light source 15 casts light onto the face of the user to be verified, the first face image will have fractal shades. The shade calculation unit 138 may accordingly generate the third determination value so that the verification unit 135 may determine whether the face image corresponds to a real face. More explicitly, when a real human face is illuminated by the light source 15, there may be shadow in some parts on the face such as the orbital, the alae of the nose, or the ear. On the contrary, when the face image in a picture is illuminated by the light source 15, there is no shadow in the aforementioned parts of the face. Hence, the shade calculation unit 138 may generate the third determination value according to whether there is particular shadow in the face image. In this embodiment, the processing module 13 may assign the first determination value and the third determination value with different weight values, so the verification unit 135 may determine whether the first face image passes the identification according to the first determination value with its weight value and the third determination value with its weight value.

In another embodiment, the processing module 13 may take the first determination value, the second determination value, and the third determination value into consideration and give these three determination values with different weight value. Then the verification unit 135 may determine whether the first face image passes the identification according to these three determination values and their corresponding weight values. For example, the first determination value may have a weight value of 0.3 and the second determination value may also have a weight value of 0.3, while the third determination value may have a weight value of 0.4. If both of the first determination value and the second determination value are "possible to be true" and the third determination value is "possible to be false," the calculated probability that the first face image should pass the identification is:

$$P(T)=0.3T+0.3T+0.4F=0.6T$$

Hence, the probability of which the first face image should pass the identification is 60%. However, what percentage of the probability should be determined to be true and the weight value of each determination value can be determined by the person having ordinary skill in the art.

Figure 5A:
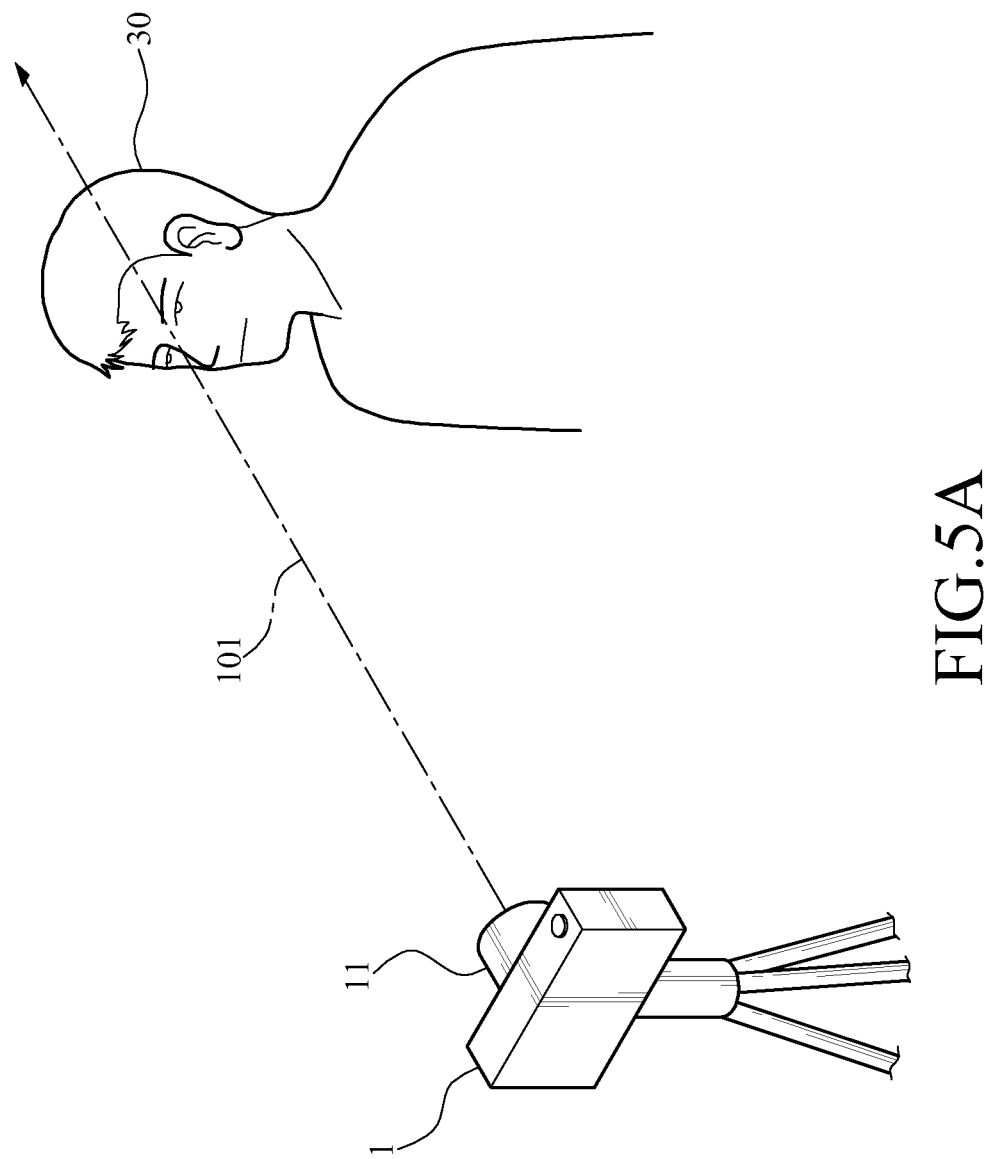
FIG. 5A is a schematic view of the operation of an apparatus of identification according to one embodiment of this invention.
Figure 5B:
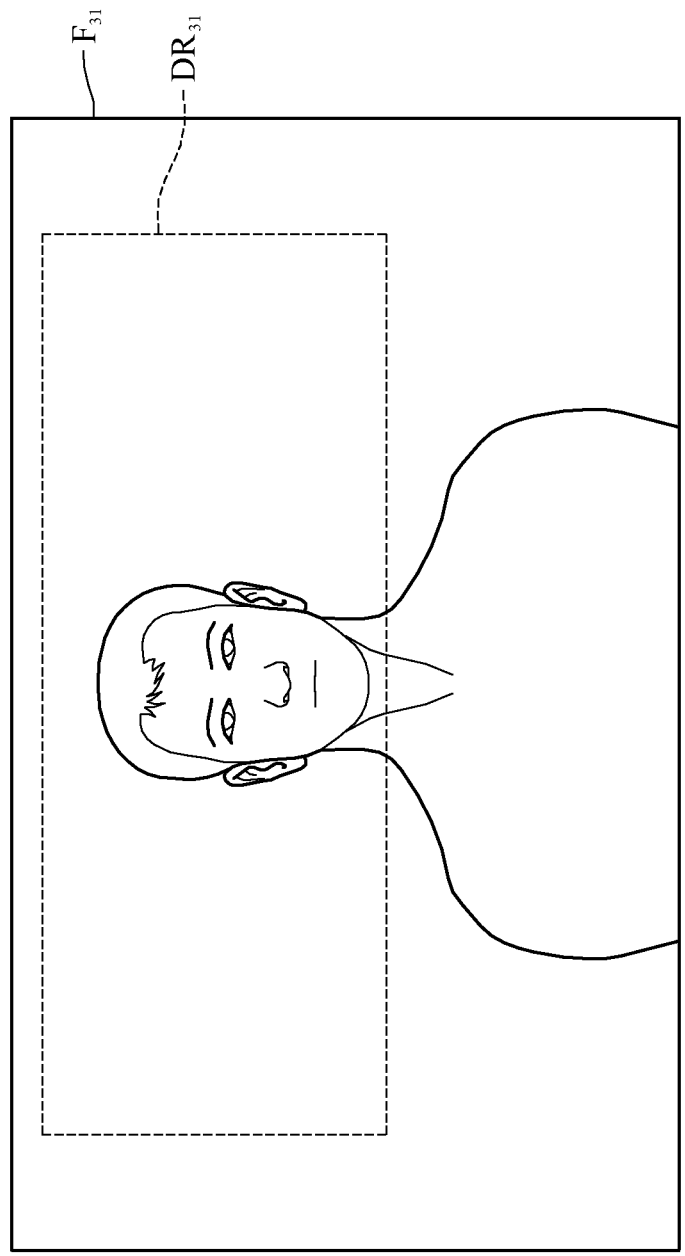
FIG. 5B is an image captured in the operation in FIG. 5A.
Figure 5C:
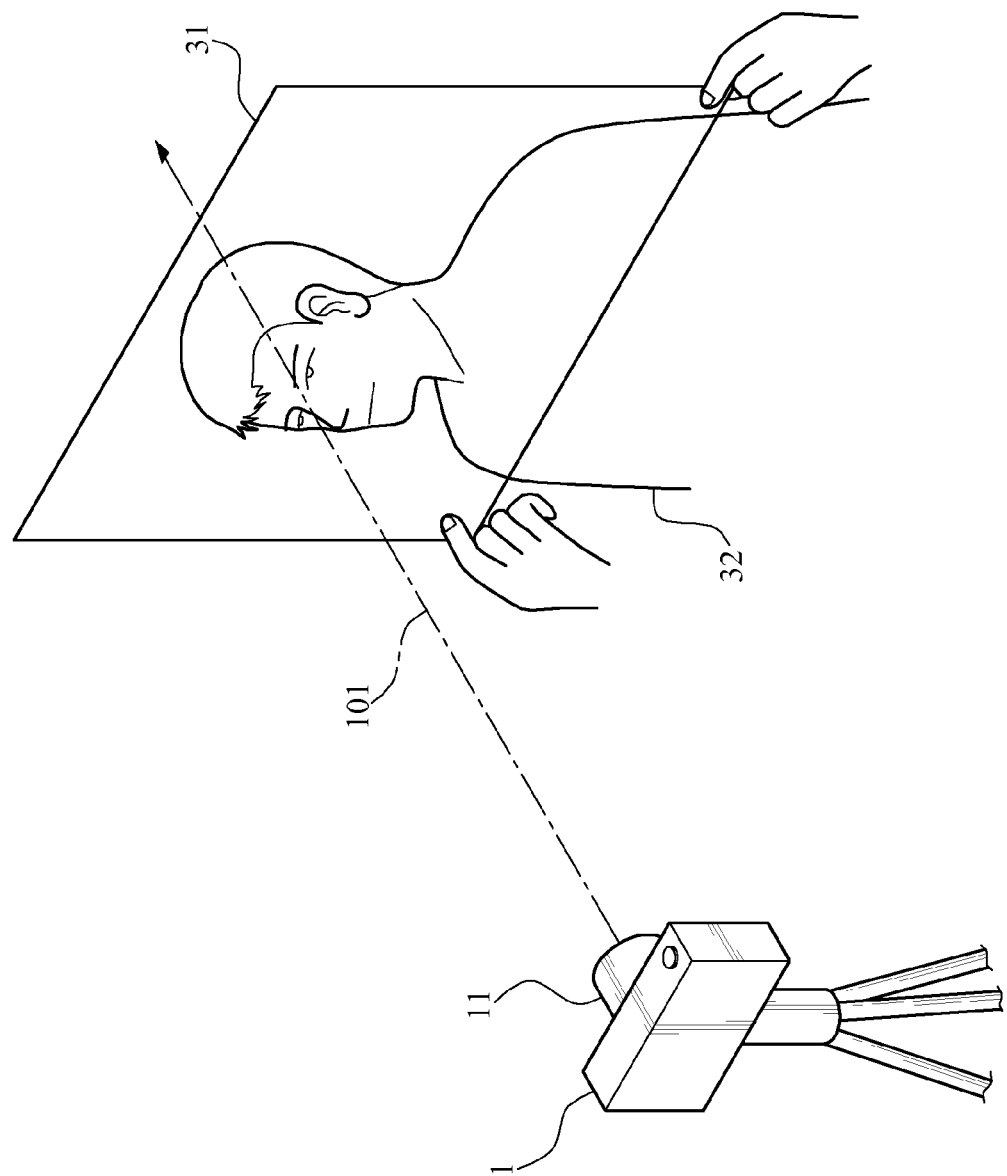
FIG. 5C is a schematic view of the operation of an apparatus of identification according to another embodiment of this invention.
Figure 5D:
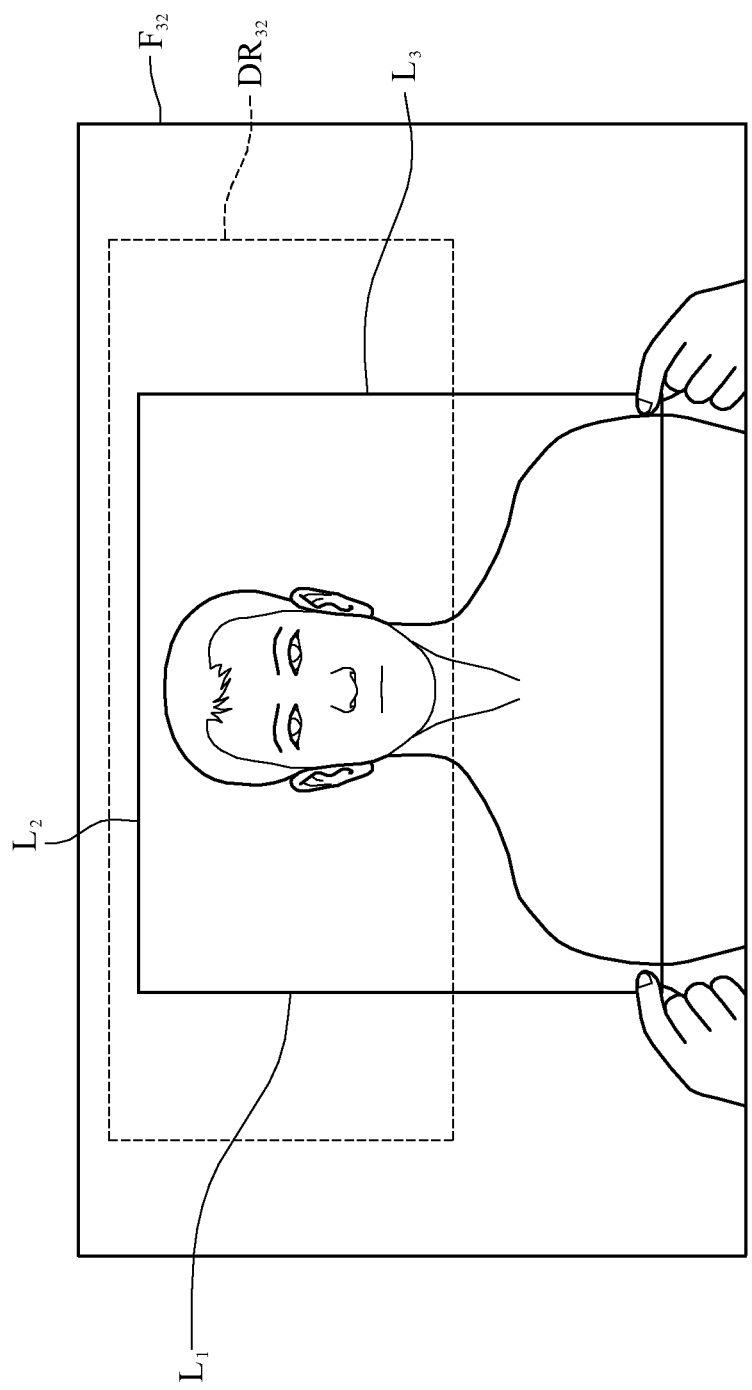
FIG. 5D is an image captured in the operation in FIG. 5C.

To understand how the apparatus of identification 1 works in practice, please refer to FIG. 1 and FIG. 5A through FIG. 5D, wherein FIG. 5A is a schematic view of the operation of an apparatus of identification according to one embodiment of this invention, and FIG. 5B is an image captured in the operation in FIG. 5A, and FIG. 5C is a schematic view of the operation of an apparatus of identification according to another embodiment of this invention, and FIG. 5D is an image captured in the operation in FIG. 5C. As shown in FIG. 5A, the user to be verified 30 is standing in front of the apparatus of identification 1, and the image capturing module 11 of the apparatus of identification 1 captures the first verifying image toward the first direction 101. The captured image, the first verifying image F31, is as shown in FIG. 5B. The line detection unit 133 in the processing module 13 chooses the detection image block DR31 from the first verifying image F31 and calculates the amount of straight lines outside of the face image but within the detection image block DR31. As shown in FIG. 5B, there is no straight line outside of the face image but within the detection image block DR31, so the amount of straight lines is zero. Accordingly, the verification unit 135 determines the amount of straight lines is less than the threshold of amount and set the first determination value as "possible to be true." Then the first face image is determined according to the first determination value to pass the identification.

If the user to be verified wants to pretend to be someone else with a picture, as shown in FIG. 5C, the picture 31 is used by the user to be verified 32 to pretend to be someone else. The first verifying image captured by the image capturing module 11 is as shown in FIG. 5D. The line detection unit 133 in the processing module 13 selects the detection image block DR32 from the first verifying image F32 and calculates the amount of straight lines outside of the face image but within the detection image block DR32. As shown in FIG. 5D, the straight lines outside of the face image but within the detection image block DR32 are the first straight line L1, the second straight line L2, and the third straight line L3, so the amount of the straight lines is three. If the threshold of amount is set to be two, the verification unit 135 may determine that the amount of straight lines is greater than the threshold of amount and set the first determination value as "possible to be false." In another embodiment, if the number of pixels occupied by the straight lines L1, L2, and L3 is larger than the number of pixels within one raw of the first verifying image F32, so the verification unit 135 may set the first determination value as "possible to be false." Eventually, the first face image is determined to fail to pass the identification according to the first determination value.

Figure 6A:
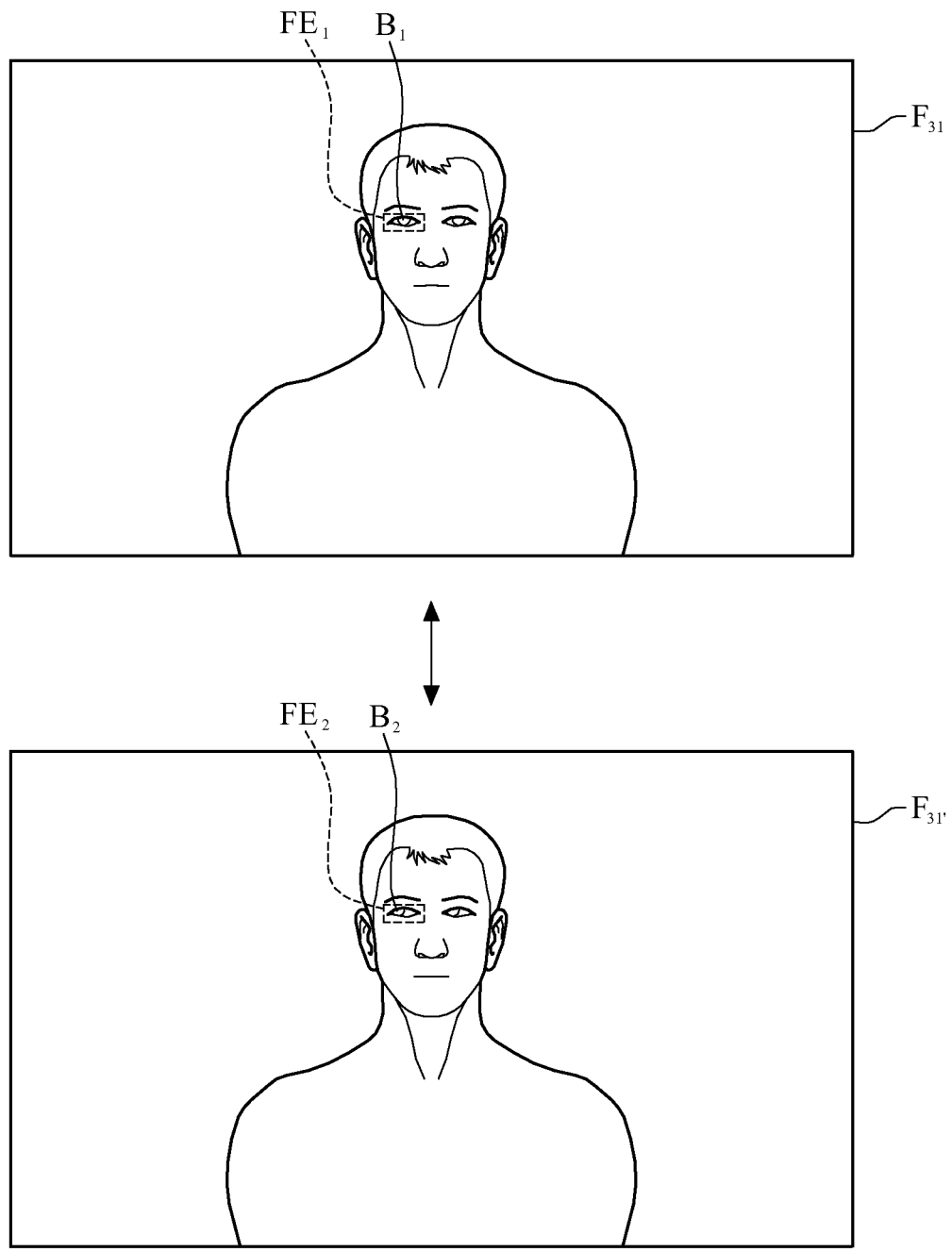
FIG. 6A is a comparison between the first verifying image and the second verifying image according to one embodiment of this invention.
Figure 6B:
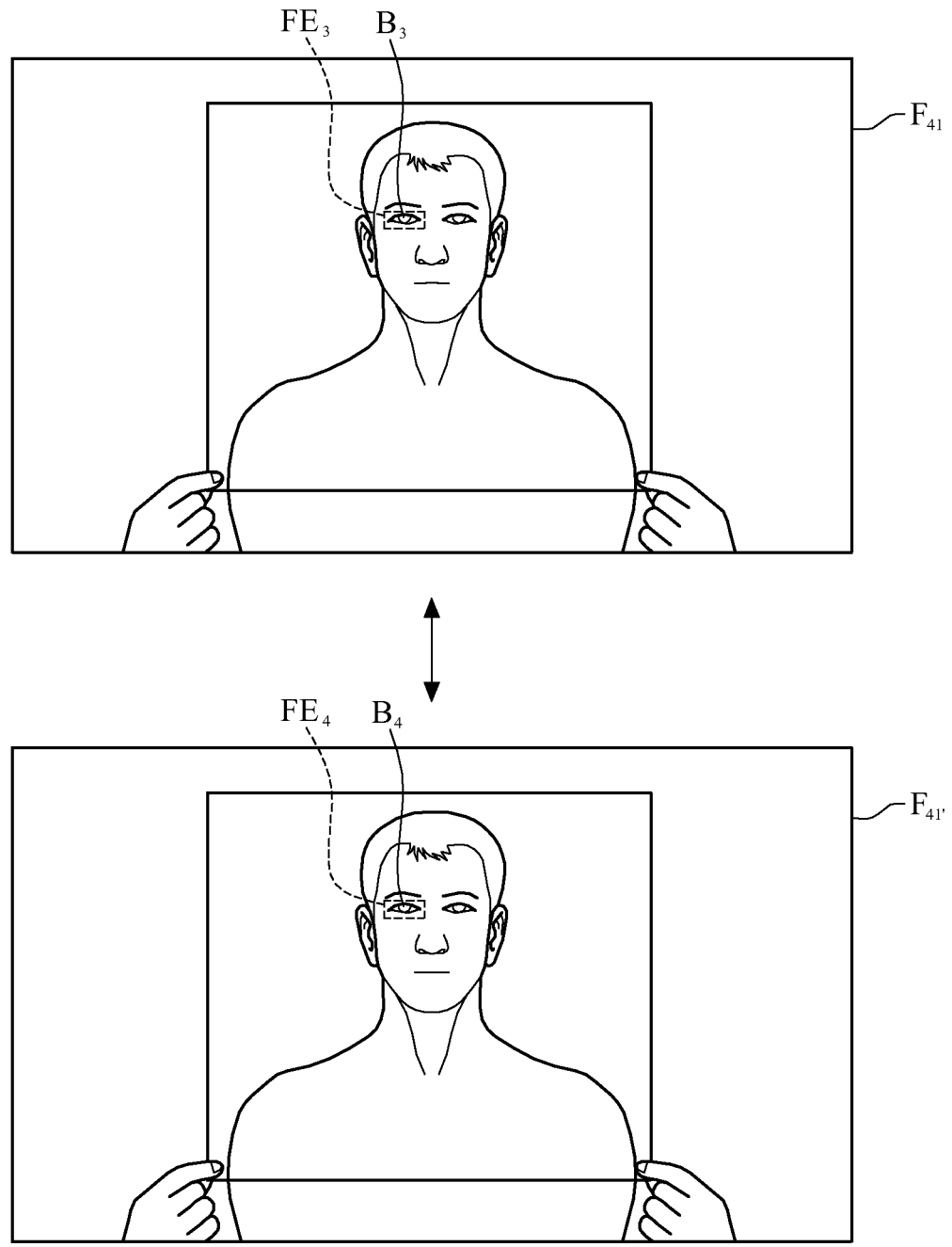
FIG. 6B is a comparison between the first verifying image and the second verifying image according to another embodiment of this invention.

In another embodiment of this invention, please refer to FIG. 1, FIG. 6A, and FIG. 6B, wherein FIG. 6A is a comparison between the first verifying image and the second verifying image according to one embodiment of this invention, and FIG. 6B is a comparison between the first verifying image and the second verifying image according to another embodiment of this invention. As shown in FIG. 6A, if the user to be verified standing directly in front of the apparatus of identification 1, the difference calculation unit 136 may firstly calculate the first relative position between the first eye image FE1 and the first pupil image B1 in the first verifying image F31. Then the second relative position between the second eye image FE2 and the second pupil image B2 in the second verifying image F31' is also be calculated. The first relative position is different from the second relative position because the user to be verified would unintentionally move his/her eye balls. Accordingly, the difference calculation unit 136 may calculate the amount of differences, and the difference comparison unit 137 would compare the amount of differences with the threshold of difference. Because the amount of differences is greater than the threshold of difference, the second determination value may be set as "possible to be true."

On the contrary, if the user to be verified attempts to pretend to be someone else with a picture, as shown in FIG. 6B, the difference calculation unit 136 may firstly calculate the first relative position between the first eye image FE3 and the first pupil image B3 in the first verifying image F41. Then the second relative position between the second eye image FE4 and the second pupil image B4 in the second verifying image F41' is also be calculated. Then, the difference comparison unit 137 may determine that the amount of differences is not greater than the threshold of difference and set the second determination value as "possible to be false" accordingly.

Figure 7A:
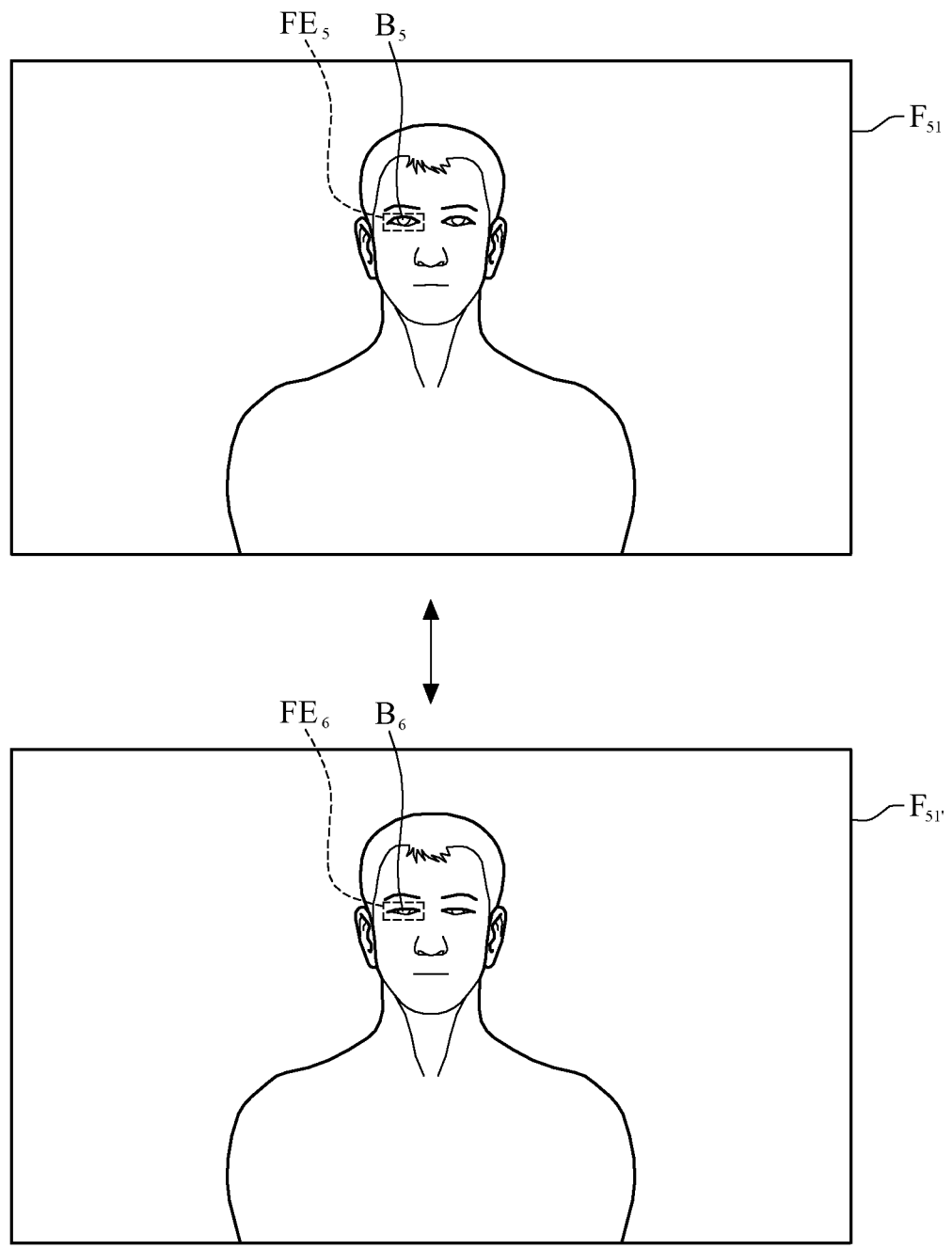
FIG. 7A is a comparison between the first verifying image and the second verifying image according to one embodiment of this invention.
Figure 7B:
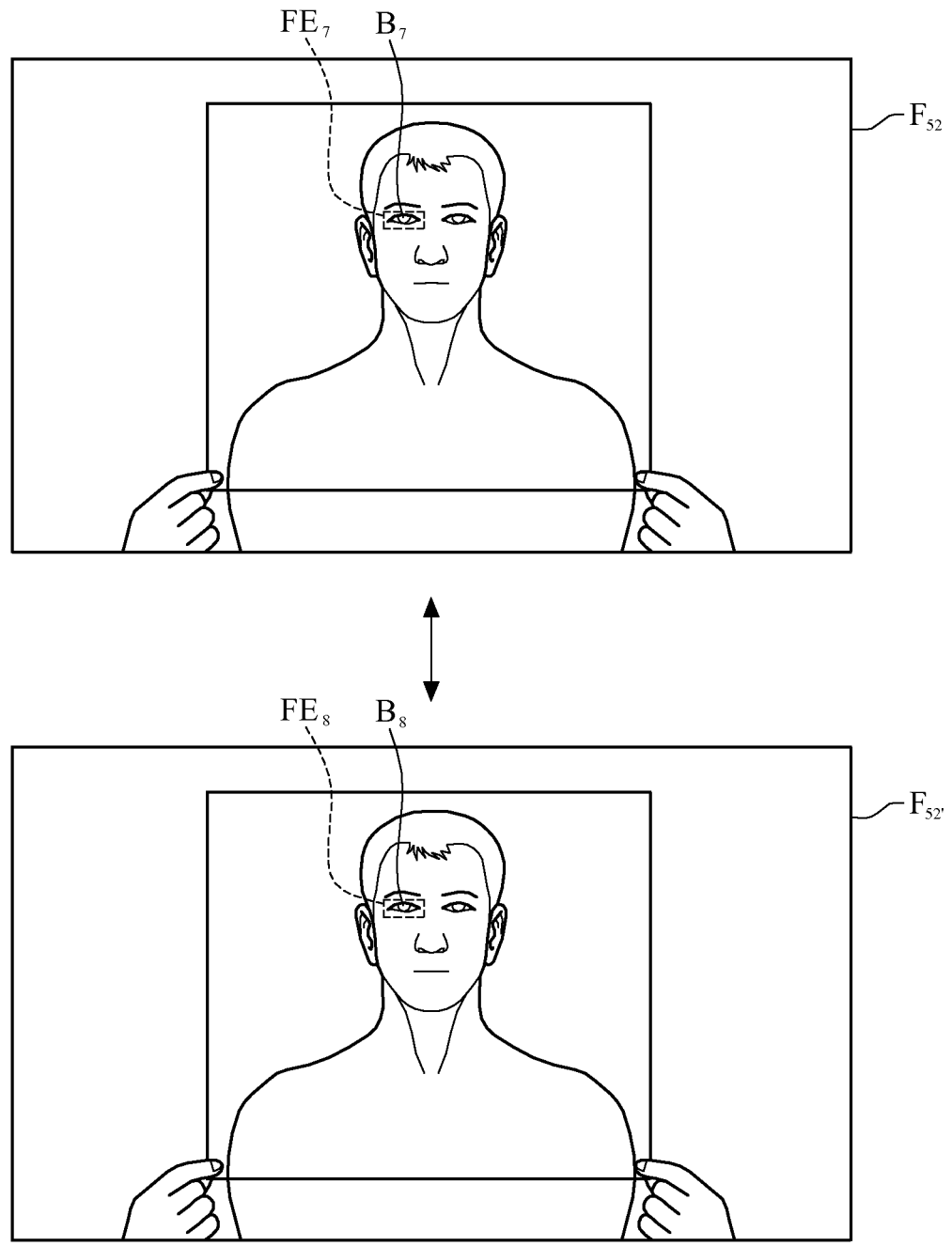
FIG. 7B is a comparison between the first verifying image and the second verifying image according to another embodiment of this invention.

In yet another embodiment, please refer to FIG. 1, FIG. 7A, and FIG. 7B, wherein FIG. 7A is a comparison between the first verifying image and the second verifying image according to one embodiment of this invention, and FIG. 7B is a comparison between the first verifying image and the second verifying image according to another embodiment of this invention. As shown in FIG. 7A, if the user to be verified is directly standing in front of the apparatus of identification 1, the difference calculation unit 136 may firstly calculate the first pupil ratio between the first eye image FE5 and the first pupil image B5 in the first verifying image F51. The second pupil ratio between the second eye image FE6 and the second pupil image B6 in the first verifying image F51' may be also calculated. The first pupil ratio is different from the second pupil ratio because the user to be verified would unintentionally blink. Hence, the difference calculation unit 136 may obtain the amount of differences according to these two pupil ratios, and the difference comparison unit 137 may compare the amount of differences with the threshold of difference. The second determination value may be set as "possible to be true" because the amount of differences is greater than the threshold of difference.

On the contrary, if the user to be verified attempts to pretend to be someone else with a picture, as shown in FIG. 7B, the difference calculation unit 136 may firstly calculate the first pupil ratio between the first eye image FE7 and the first pupil image B7 in the first verifying image F52. The second pupil ratio between the second eye image FE8 and the second pupil image B8 in the second verifying image F52' may also be calculated. The first pupil ratio is equal to the second pupil ratio, so the difference comparison unit 137 would determine that the amount of differences is not greater than the threshold of difference and set the second determination value as "possible to be false."

Figure 8A:
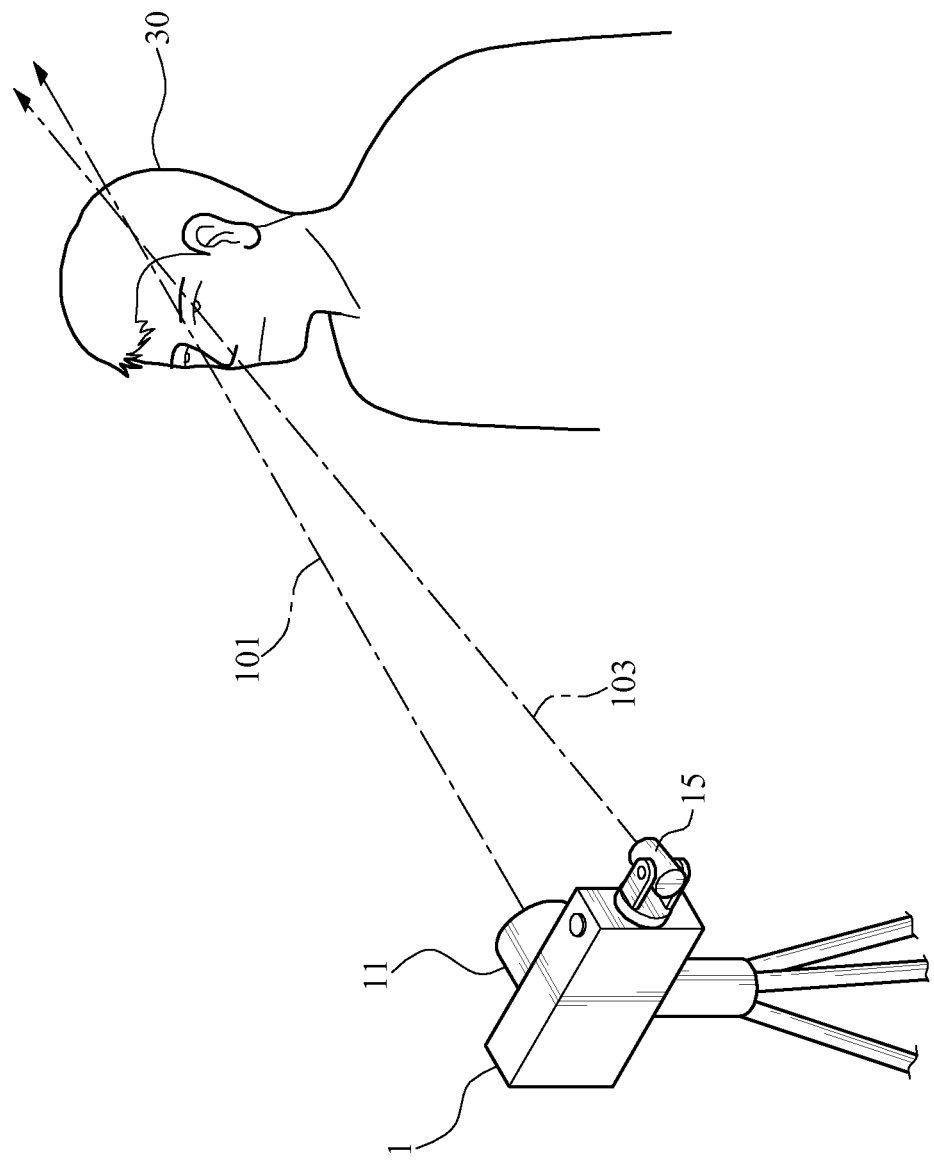
FIG. 8A is a schematic view of the operation of an apparatus of identification according to one embodiment of this invention.
Figure 8B:
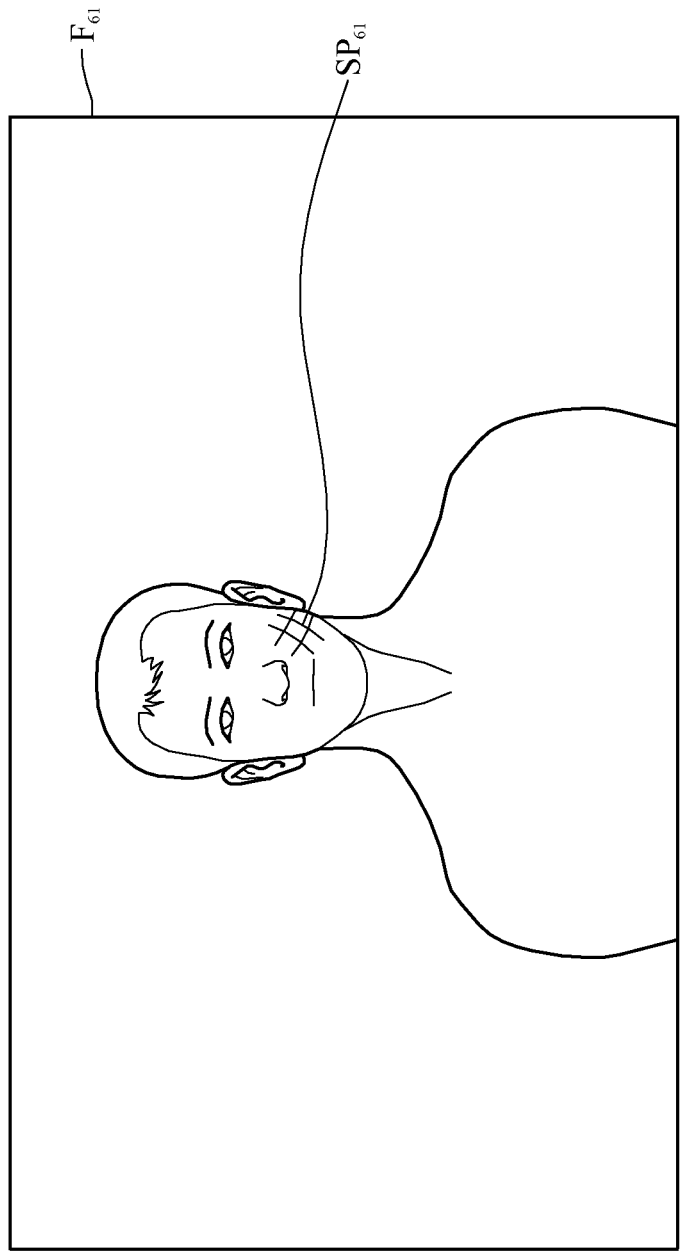
FIG. 8B is an image captured in the operation in FIG. 8A.
Figure 8C:
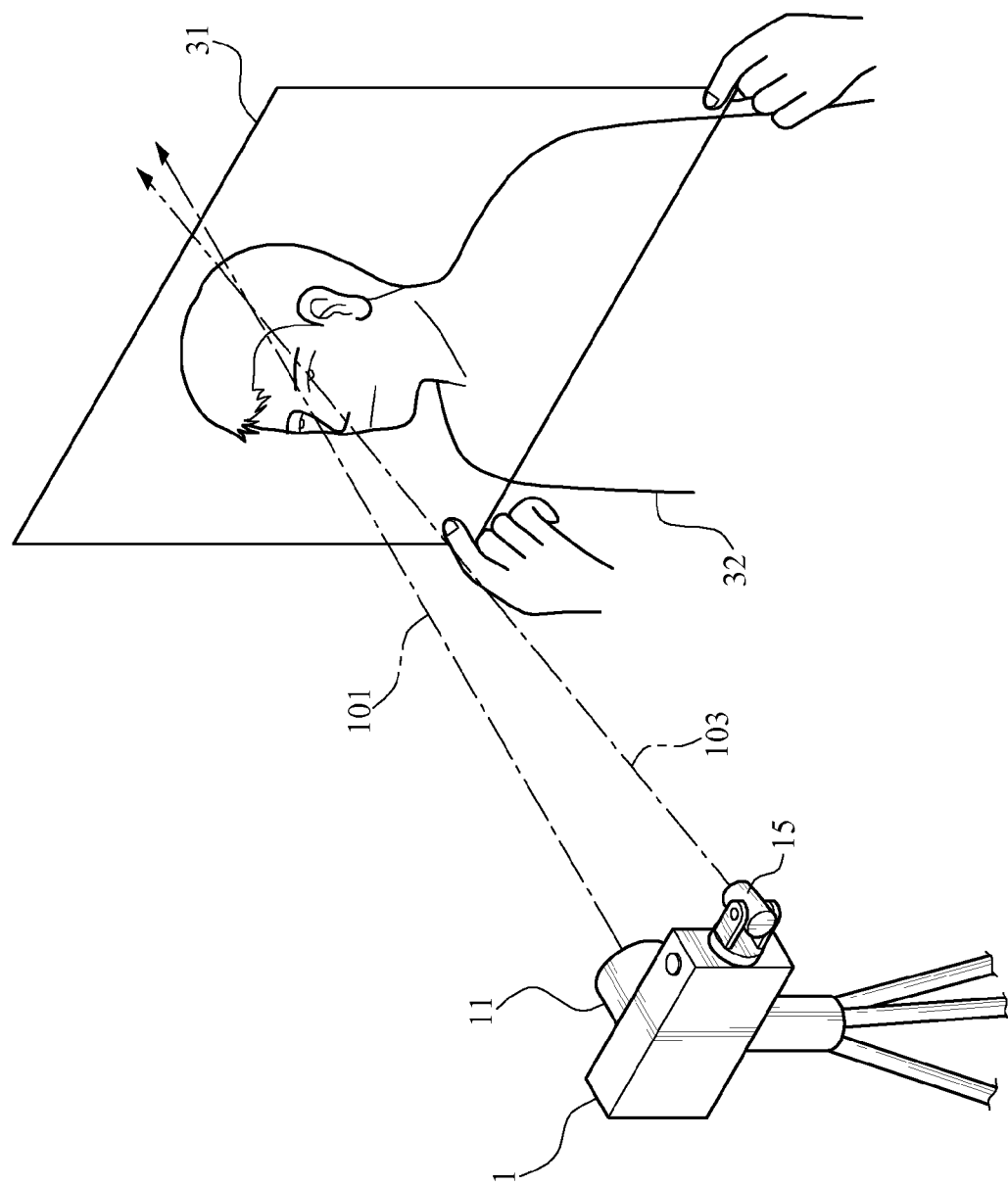
FIG. 8C is a schematic view of the operation of an apparatus of identification according to another embodiment of this invention.
Figure 8D:
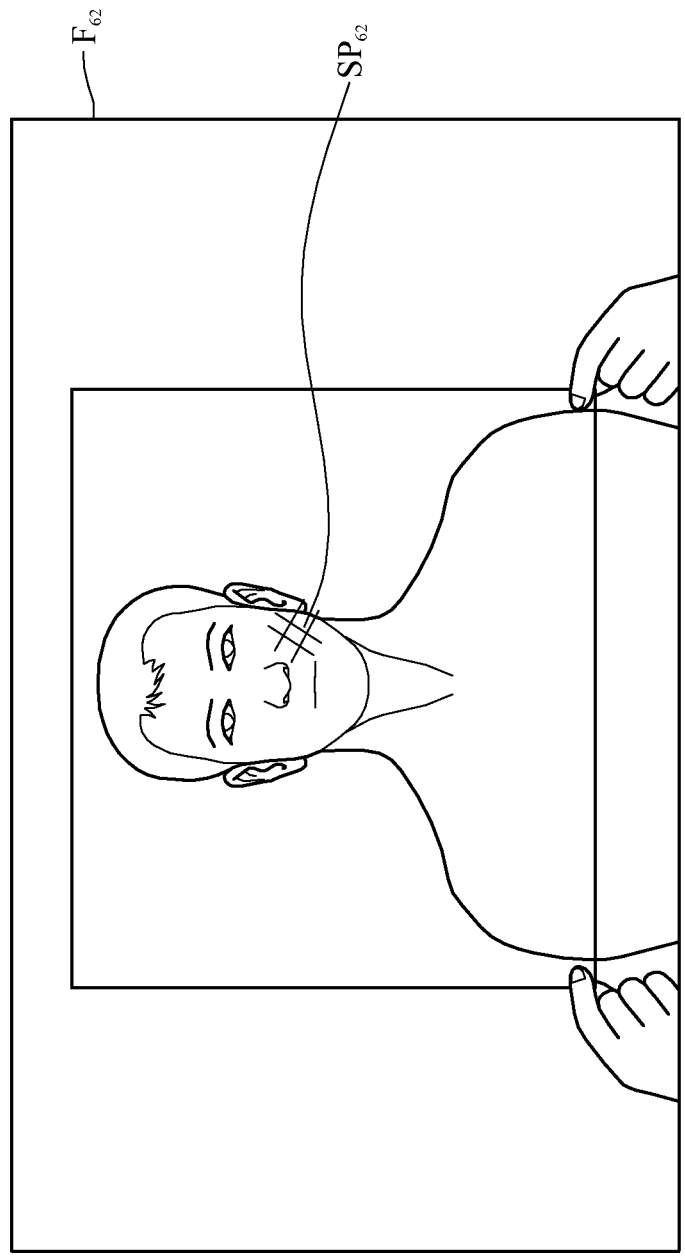
FIG. 8D is an image captured in the operation in FIG. 8C.

As to how the apparatus of identification 1 works in yet another embodiment of this invention, please refer to FIG. 1 and FIG. 8A through FIG. 8D, wherein FIG. 8A is a schematic view of the operation of an apparatus of identification according to one embodiment of this invention, and FIG. 8B is an image captured in the operation in FIG. 8A, and FIG. 8C is a schematic view of the operation of an apparatus of identification according to another embodiment of this invention, and FIG. 8D is an image captured in the operation in FIG. 8C. As shown in FIG. 8A, the user to be verified 30 is standing in front of the apparatus of identification 1. The image capturing module 11 captures the first verifying image F61 toward the first direction 101. The light source 15 having a specific predetermined pattern cast light toward the second direction 103. The captured image, the first verifying image F61, is as shown in FIG. 8B. The spot SP61 corresponding to the light source 15 may be found in the face image in the first verifying image F61. The spot SP61 varies irregularly because of the shape of the real human face, so the shade calculation unit 138 may calculate the variation and set the third determination value as "possible to be true."

If the user to be verified attempts to pretend to be someone else with a picture, as shown in FIG. 8C, the picture 31 is used by the user to be verified 32 to pretend to be someone else. The first verifying image F62 captured by the image capturing module 11 is as shown in FIG. 8D. The shade calculation unit 138 in the processing module 13 may calculate that the spot SP62 in the first verifying image F62 does not vary irregularly, and the spot SP62 further extends to a region outside of the face image. Hence, the shade calculation unit 138 may set the third determination value as "possible to be false."

Hence, the apparatus of identification 1 according to one or more embodiments of this invention may determine whether the user to be verified attempts to pretend to be someone else with a picture or a display device according to at least one of the determination criteria aforementioned. Each criterion may be applied solely, and more than one criteria may be applied together to increase the reliability of the disclosed apparatus.

Figure 9A:
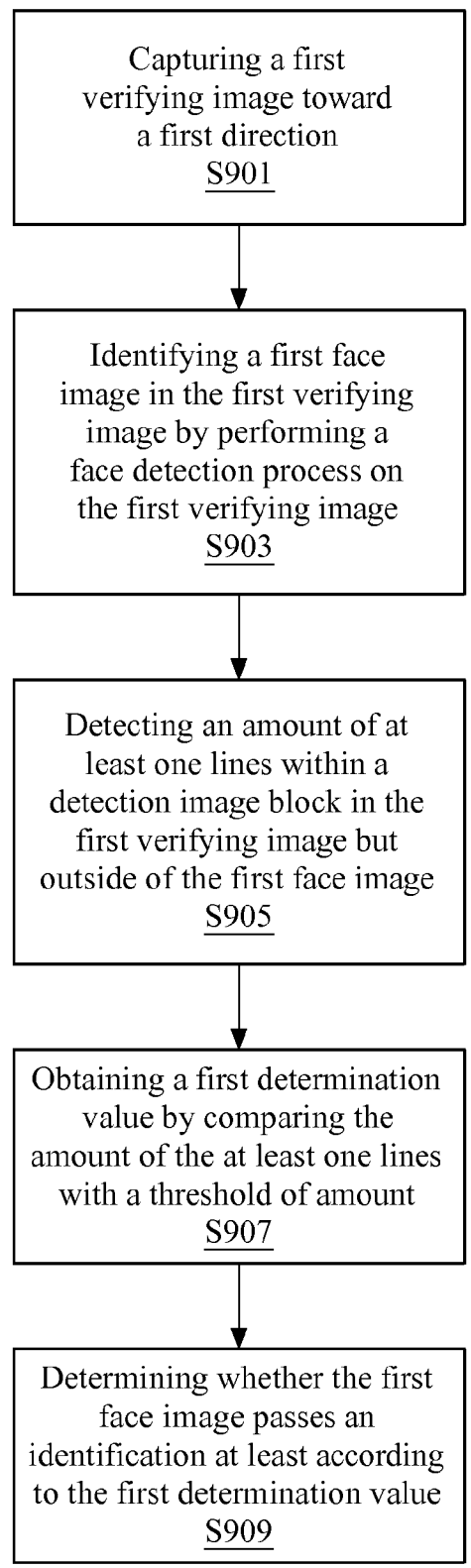
FIG. 9A is a flowchart of the identification method according to one embodiment of this invention.

In one embodiment of this invention, the identification method may be concluded as shown in FIG. 9A, which is a flowchart of the identification method according to one embodiment of this invention. As shown in step S901, capturing a first verifying image toward a first direction. As shown in step S903, identifying a first face image in the first verifying image by performing a face detection process on the first verifying image. As shown in step S905, detecting an amount of at least one line within a detection image block in the first verifying image but outside of the first face image. As shown in step S907, obtaining a first determination value by comparing the amount of the at least one lines with a threshold of amount. As shown in step S909, determining whether the first face image passes the identification at least according to the first determination value.

Figure 9B:
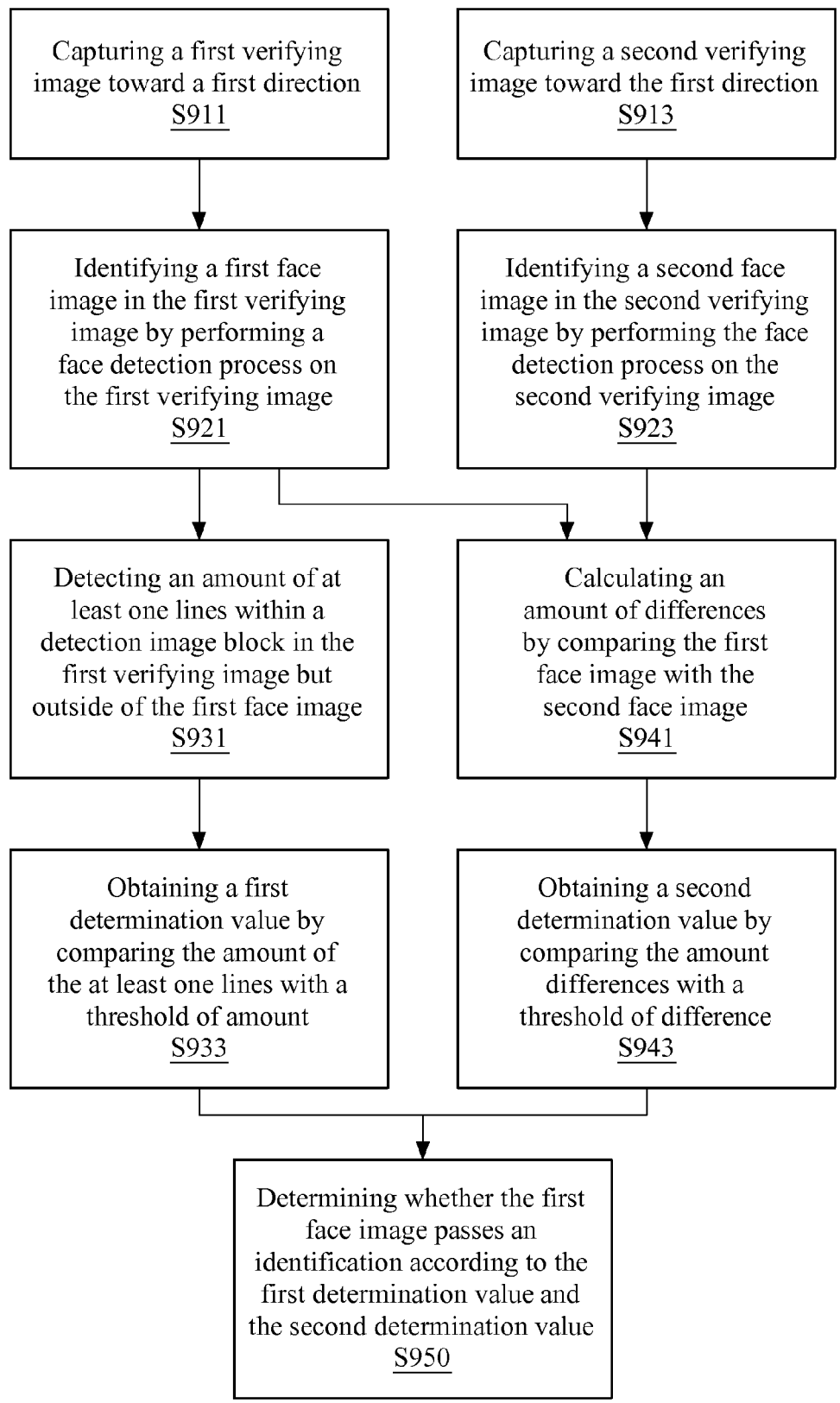
FIG. 9B is a flowchart of the identification method according to another embodiment of this invention.

In another embodiment of this invention, the flow of the disclosed method may be concluded as shown in FIG. 9B, which is a flowchart of the identification method according to another embodiment of this invention. As shown in step S911, capturing a first verifying image toward a first direction. As shown in step S913, capturing a second verifying image toward the first direction. As shown in step S921, identifying a first face image in the first verifying image by performing a face detection process on the first verifying image. As shown in step S923, identifying a second face image in the second verifying image by performing the face detection process on the second verifying image. As shown in step S931, detecting an amount of at least one line within a detection image block in the first verifying image but outside of the first face image. As shown in step S933, obtaining a first determination value by comparing the amount of the at least one lines with a threshold of amount. As shown in step S941, calculating an amount of differences by comparing the first face image with the second face image. As shown in step S943, obtaining a second determination value by comparing the amount differences with a threshold of difference. As shown in step S950, determining whether the first face image passes the identification according to the first determination value and the second determination value.

With the apparatus of identification and the corresponding method disclosed in one or more embodiments of this invention, after a verifying image is captured, the amount of straight lines within the verifying image but outside of the face image is analyzed so that whether there is a frame of a picture or a frame of a display device is determined. Besides, the differences between a plurality verifying images may be analyzed as well so as to determine whether the face image in the verifying image is corresponding to a real person or a picture, a display device, etc. As such, the user to be verified is prevented from attempting to pretend to be someone else with a picture or a display device, so the reliability and the security of the identification are improved.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. An identification method, comprising:
   capturing a first verifying image toward a first direction;
   identifying a first face image in the first verifying image by performing a face detection process on the first verifying image;
   detecting an amount of at least one straight line within a detection image block in the first verifying image but outside of the first face image;

obtaining a first determination value by comparing the amount of the at least one straight line with a threshold of amount;

determining whether the first face image passes an identification at least according to the first determination value;

capturing a second verifying image toward the first direction;

identifying a second face image in the second verifying image by performing the face detection process on the second verifying image;

calculating an amount of differences by comparing the first face image with the second face image; and obtaining a second determination value by comparing the amount differences with a threshold of difference;

wherein whether the first face image passes the identification is determined further according to the second determination value.

2. The identification method according to claim 1, wherein the at least one straight line has an angle relative to the horizontal line or relative the vertical line which is less than an angle threshold.

3. The identification method according to claim 1, wherein the step of detecting the amount of the at least one straight line within a detection image block in the first verifying image but outside of the first face image comprises:

calculating a plurality of grayscales corresponding to a plurality of pixels in the detection image block; and identifying the at least one straight line within the detection image block according to the plurality of grayscales.

4. The identification method according to claim 1, wherein the step of calculating the amount of differences comprises:

identifying a first eye image in the first face image;

identifying a second eye image in the second face image corresponding to the first eye image; and calculating the amount of differences according to the first eye image and the second eye image.

5. The identification method according to claim 4, wherein the step of calculating the amount of differences according to the first eye image and the second eye image comprises:

calculating a first pupil ratio between a first pupil image in the first eye image and the first eye image;

calculating a second pupil ratio between a second pupil image in the second eye image and the second eye image; and obtaining the amount of differences by calculating a difference between the first pupil ratio and the second pupil ratio.

6. The identification method according to claim 4, wherein the step of calculating the amount of differences according to the first eye image and the second eye image comprises:

identifying a first pupil image in the first eye image;

calculating a first relative position between the first pupil image and the first eye image;

identifying a second pupil image in the second eye image;

calculating a second relative position between the second pupil image and the second eye image; and obtaining the amount of differences by calculating a difference between the first relative position and the second relative position.

7. The identification method according to claim 4, wherein the step of calculating the amount of differences according to the first eye image and the second eye image comprises:

determining whether the first eye image and the second eye image are similar images according to similarity criteria;

setting the amount of differences to be zero when the first eye image and the second eye image are similar images;

calculating an area of the first eye image and an area of the second eye image when the first eye image and the second eye image are not similar images; and obtaining the amount of differences by calculating a ratio between the area of the first eye image and the area of the second eye image.

8. The identification method according to claim 1, further comprising:

casting light toward a second direction with a light source to make the first face image to have at least one spot corresponding to the light source, wherein the light source has a predetermined pattern;

obtaining a third determination value by determining whether the spot is varied according to the predetermined pattern; and determining whether the first face image passes the identification further according to the third determination value.

9. The identification method according to claim 1, further comprising:

casting light toward a second direction with a light source to make the first face image to have at least one shade corresponding to the light source;

obtaining a third determination value according to the shade; and determining whether the first face image passes the identification further according to the third determination value.

10. An apparatus for identification, comprising:

an image capturing module, for capturing a first verifying image toward a first direction; and a processing module electrically coupled to the image capturing module, the processing module comprising:

a face identification unit electrically coupled to the image capturing module, for identifying a first face image in the first verifying image by performing a face detection process on the first verifying image;

a line detection unit electrically coupled to the image capturing module and the face identification unit, for detecting an amount of at least one straight line within a detection image block in the first verifying image but outside of the first face image;

a difference calculation unit electrically coupled to the face identification unit, for calculating an amount of differences by comparing the first face image with the second face image; and a difference comparison unit electrically coupled to the difference calculation unit, for obtaining a second determination value by comparing the amount of differences with a threshold of difference;

a verification unit electrically coupled to the line detection unit, for obtaining a first determination value by comparing the amount of the at least one straight line with a threshold of amount, and determining whether the first face image passes an identification at least according to the first determination value;

wherein the image capturing module further captures a second verifying image toward the first direction, and the face identification unit further identifies a second face image in the second verifying image by performing the face detection process on the second verifying image, and wherein whether the first face image passes the identification is determined further according to the second determination value.

11. The apparatus according to claim 10, wherein the line detection unit comprises:

a grayscale calculation circuitry electrically coupled to the image capturing module and the face identification unit, for calculating a plurality of grayscales corresponding to a plurality of pixels in the detection image block; and a line identification circuitry electrically coupled to the grayscale calculation circuitry, identifying the at least one straight line within the detection image block according to the plurality of grayscales.

12. The apparatus according to claim 10, wherein the face identification unit comprises:

a face identification circuitry electrically coupled to the image capturing module, for identifying a first face image in the first verifying image by performing a face detection process on the first verifying image and identifying a second face image in the second verifying image by performing the face detection process on the second verifying image; and an eye identification circuitry electrically coupled to the face identification circuitry and the difference calculation unit, for identifying a first eye image in the first face image and identifying a second eye image in the second face image corresponding to the first eye image;

wherein the difference calculation unit calculates the amount of differences according to the first eye image and the second eye image.

13. The apparatus according to claim 12, wherein the difference calculation unit comprises:

a ratio calculation circuitry electrically coupled to the face identification unit, for calculating a first pupil ratio between a first pupil image in the first eye image and the first eye image and calculating a second pupil ratio between a second pupil image in the second eye image and the second eye image; and a ratio difference calculation circuitry electrically coupled to the ratio calculation circuitry and the difference comparison unit, for obtaining the amount of differences by calculating a difference between the first pupil ratio and the second pupil ratio.

14. The apparatus according to claim 12, wherein the difference calculation unit comprises:

an eye motion calculation circuitry electrically coupled to the face identification unit, for identifying a first pupil image in the first eye image, calculating a first relative position between the first pupil image and the first eye image, identifying a second pupil image in the second eye image, and calculating a second relative position between the second pupil image and the second eye image; and a position difference calculation circuitry electrically coupled to the eye motion calculation circuitry and the difference comparison unit, for obtaining the amount of differences by calculating a difference between the first relative position and the second relative position.

15. The apparatus according to claim 12, wherein the difference calculation unit comprises:

a blinking determination circuitry electrically coupled to the face identification unit, for determining whether the first eye image and the second eye image are similar images according to similarity criteria and calculating an area of the first eye image and an area of the second eye image when the first eye image and the second eye image are not similar images; and a blinking difference calculation circuitry electrically coupled to the blinking determination circuitry and the difference comparison unit, for setting the amount of differences to be zero when the first eye image and the second eye image are similar images and obtaining the amount of differences by calculating a ratio between the area of the first eye image and the area of the second eye image when the first eye image and the second eye image are not similar images.

16. The apparatus according to claim 10, further comprising a light source electrically coupled to the processing module, wherein the light source has a predetermined pattern and is used for casting light toward a second direction to make the first face image to have at least one spot corresponding to the light source, and the processing module further comprises:

a shade calculation unit electrically coupled to the light source, the face identification unit, and the verification unit, for obtaining a third determination value by determining whether the spot is varied according to the predetermined pattern;

wherein the verification unit determines whether the first face image passes the identification further according to the third determination value.

17. The apparatus according to claim 10, further comprising a light source electrically coupled to the processing module, wherein the light source is used for casting light toward a second direction to make the first face image to have at least one shade corresponding to the light source, and the processing module further comprises:

a shade calculation unit electrically coupled to the light source, the face identification unit, and the verification unit, for obtaining a third determination value according to the shade;

wherein the verification unit determines whether the first face image passes the identification further according to the third determination value.

* * * * *